United States Patent [19]

Nakai et al.

[11] Patent Number: 5,267,066
[45] Date of Patent: Nov. 30, 1993

[54] LIQUID CRYSTAL DISPLAY DEVICE, METHOD OF CORRECTING DEFECTIVE PIXELS, AND DEFECTIVE-PIXEL CORRECTING APPARATUS USED THEREIN

[75] Inventors: Syunzi Nakai, Moriguchi; Toshio Maeda, Ikoma; Teruo Horii, Yamatokoriyama; Seiichi Kajitani, Kitakatsuragi; Tadashi Nishioka, Tenri; Shigeharu Ino, Osaka, all of Japan

[73] Assignee: Sharp Kabushiki Kaisha, Osaka, Japan

[21] Appl. No.: 858,137

[22] Filed: Mar. 26, 1992

[30] Foreign Application Priority Data

Mar. 27, 1991 [JP] Japan .................. 3-063294
Jul. 18, 1991 [JP] Japan .................. 3-178395

[51] Int. Cl.$^5$ .................. G02F 1/1335; G02F 1/1343
[52] U.S. Cl. .................. 359/67; 359/59; 359/62
[58] Field of Search .................. 359/67, 59, 62

[56] References Cited

U.S. PATENT DOCUMENTS

| | | | |
|---|---|---|---|
| 2,782,756 | 2/1957 | Hunt | 118/211 |
| 5,095,379 | 3/1992 | Fukunaga | 359/68 |
| 5,121,236 | 6/1992 | Ukai et al. | 359/59 |
| 5,142,386 | 8/1992 | Ishihara | 359/68 |

FOREIGN PATENT DOCUMENTS

| | | |
|---|---|---|
| 0366459 | 5/1990 | European Pat. Off. . |
| 0404072 | 12/1990 | European Pat. Off. . |
| 0501837 | 9/1992 | European Pat. Off. . |
| 1-068723 | 6/1989 | Japan . |
| 1-138539 | 8/1989 | Japan . |
| 3-21928 | 1/1991 | Japan . |

OTHER PUBLICATIONS

N. Morozumi et al., "Part 5, Panel Technique Thesis Active Matrix Liquid Crystal: Structure" Nikkei BP sha Denki Group, Nov. 1, 1989, pp. 124–133.

*Primary Examiner*—William L. Sikes
*Assistant Examiner*—Anita Pellman Gross
*Attorney, Agent, or Firm*—David G. Conlin; Robert F. O'Connell

[57] ABSTRACT

In a liquid crystal display device having pixels arranged in a matrix form, light is allowed to pass or blocked depending upon whether or not a voltage is applied to electrodes each corresponding to the pixels, and the display operation is conducted by controlling the transmission/nontransmission of light. When a conductor or switching element connected to an electrode is broken, it is not possible to apply such a voltage to the respective electrode. Such a pixel is always at the light transmission display state, with the result that the pixel becomes a bright spot, thereby degrading the display quality. Therefore, a blocking piece for blocking light is disposed over the pixel which becomes a bright spot. This prevents the bright spot from appearing, thereby improving the display quality.

12 Claims, 11 Drawing Sheets

LIQUID CRYSTAL DISPLAY DEVICE, METHOD OF CORRECTING DEFECTIVE PIXELS, AND DEFECTIVE-PIXEL CORRECTING APPARATUS USED THEREIN

BACKGROUND OF THE INVENTION

1. Field of the Invention

The present invention relates to a liquid crystal display device.

2. Description of the Related Art

In a liquid crystal display device having pixels arranged in a matrix form, light is allowed to pass or blocked depending upon whether or not a voltage is applied to electrodes each corresponding to the pixels, and the display operation is conducted by controlling the transmission/nontransmission of light.

When a conductor for applying a voltage to electrodes is short-circuited or open-circuited, it is not possible to apply such a voltage to the respective electrode. The pixel corresponding to this conductor cannot be applied with a voltage, so that it is always at the display state of no-voltage application, with the result that the display control for the pixel cannot be conducted. Namely, the pixel becomes a defective-pixel.

In a display device wherein light is blocked when a voltage is applied to electrodes corresponding to pixels, it is impossible to block the light transmission through such a defective-pixel. When normal pixels surrounding such a defective-pixel are operated so as to block the light transmission, such a defective-pixel appears as a bright spot, thereby extremely degrading the display quality of the display device.

In a display device wherein thin film transistors (hereinafter, referred to as "TFTs") are used as switching elements, when an insulation failure occurs in a TFT, a voltage is always applied to the electrode connected to this defective TFT.

In a display device wherein TFTs are used and wherein light is not blocked when a voltage is applied to electrodes corresponding to pixels, it is impossible to block the light transmission through such defective-pixel. When normal pixels surrounding such a defective-pixel are operated so as to block the light transmission, such a defective-pixel appears as a bright spot, thereby extremely degrading the display quality of the display device.

In order to prevent such defective-pixel from being generated, conventionally, each pixel is connected to two conductors so that, even if one of the two conductors is damaged, the display operation of the corresponding pixel is not affected by this failure. Alternatively, each pixel is divided into two portions and provided with a plurality of electrodes so that, when a voltage cannot be applied to one of the plurality of electrodes, the display operation of the corresponding pixel is performed using the other electrodes.

In a liquid crystal display device wherein each pixel is connected to two conductors or divided into two portions and provided with a plurality of electrodes, there is a problem in that the circuit is complex in configuration and therefore it is difficult to design and construct the complicated circuit. Moreover, the complicated circuit and the increased number of conductors cause a problem in that an large area is required for forming the conductors, resulting in the reduced area of the electrodes and the lowered luminous intensity of the display.

When a plurality of electrodes are used for displaying one pixel, there is a problem in that the burden of the circuit for driving the electrodes is heavy.

Even if the countermeasures in the prior art are taken, when both the two conductors connected to a pixel are broken or when all of the conductors respectively connected to the electrodes constituting a pixel are broken, it is not possible to prevent a bright spot from being produced.

SUMMARY OF THE INVENTION

It is an object of the invention to provide a liquid crystal display device in which the light leakage from a region corresponding to a defective-pixel is prevented from occurring, and thus the display quality is improved.

According to the invention, in a liquid crystal display device comprising pixels arranged in a matrix form, shield means is disposed in to a defective-pixel region of the liquid crystal display device.

In a liquid crystal display device of the invention, the shield means may be disposed on a glass substrate of the liquid crystal display device.

In a liquid crystal display device of the invention, the shield means may be disposed in a concave portion formed on a glass substrate of the liquid crystal display device.

In a liquid crystal display device of the invention, the shield means may be disposed on a polarizing plate of the liquid crystal display device.

In a liquid crystal display device of the invention, the shield means may be disposed in a concave portion formed on a polarizing plate of the liquid crystal display device.

In a liquid crystal display device of the invention, the surface of the shield means may have either of a concave form, a convex form and a flat form.

In a liquid crystal display device of the invention, a defective-pixel region has a rough surface.

According to the invention, in a method of correcting a defective-pixel in a liquid crystal display device having pixels arranged in a matrix form, a light shielding fluid is introduced dropwise into a defective-pixel region in the liquid crystal display device, and cured therein.

In a method of the invention, the light shielding fluid may be dropped into a defective-pixel region of a glass or polarizing plate of the liquid crystal display device.

In a method of the invention, the light shielding fluid may be dropped into a concave portion formed in a defective-pixel region.

In a method of the invention, a surface of a defective-pixel region may be roughed by irradiating a laser beam.

According to the invention, an apparatus for correcting a defective-pixel region in a liquid crystal display device comprising pixels arranged in a matrix form comprises: a fluid bath for holding a fluid which functions as shield means; a needle to which the fluid can adhere; a mounting stage for the liquid crystal display device; first means for relatively moving at least one of the needle and the mounting stage in a horizontal plane; and second means for vertically moving at least one of the needle and the mounting stage. In the apparatus, the needle is disposed over the fluid bath using the first moving means, the needle is lowered using the second moving means so as to be immersible into the fluid bath, the needle to which the fluid has adhered is raised using the second moving means over the fluid bath, the needle to which the fluid has adhered is moved over the defective-pixel region using the first moving means, and the tip of the needle is moved to the defective-pixel region in the liquid crystal display device using the second moving means, thereby causing the fluid adhering to the tip of the needle to adhere to the defective-pixel region.

An apparatus of the invention may further comprise laser means for conducting at least one of the roughing and concaving operations against the surface of a region corresponding to a defective-pixel region.

According to the invention, in a liquid crystal display device having pixels arranged in a matrix form, block means is disposed in a region corresponding to a defective-pixel. Therefore, light leaking from the defective-pixel region is blocked by the block means, and thus the light leakage from the defective-pixel region is prevented from occurring.

According to the invention, the block means may be disposed on a glass substrate or polarizing plate of the liquid crystal display device. In either case, the light leakage from the defective-pixel region is prevented from occurring.

According to the invention, the block means may be disposed in a concave portion formed on a glass substrate or polarizing plate of the liquid crystal display device. The provision of a blocking piece in a concave portion prevents the light leakage from the defective-pixel region from occurring. Since the blocking piece is disposed in the concave portion, the blocking piece does not come into contact with another member in a step such as that of mounting the liquid crystal display device, thereby preventing the blocking piece from peeling off.

According to the invention, the surface of the block means may have a concave form, or convex form or a flat form. In each case, the light leakage from the defective-pixel region is prevented from occurring.

According to the invention, the region corresponding to the defective pixel region has a rough surface. This improves the adhesive force of the blocking piece.

According to the invention, in a method of correcting a defective-pixel in a liquid crystal display device having pixels arranged in a matrix form, a shielding fluid is introduced dropwise into a region corresponding to a defective-pixel in a liquid crystal display device, and cured therein.

According to the invention, the light shielding fluid may be dropped into a region of the liquid crystal display device or polarizing plate which corresponds to a defective-pixel.

According to the invention, the light shielding fluid may be dropped into a concave portion formed in a region corresponding to a defective-pixel.

According to the invention, the surface of a region corresponding to a defective-pixel may be roughed by irradiating a laser beam. This improves the adhesive force of the block means disposed in the defective-pixel region.

According to the invention, an apparatus for correcting a defective-pixel in a liquid crystal display device having pixels arranged in a matrix form comprises: a fluid bath for holding a fluid which functions as shield means; a needle to which the fluid can adhere; a mounting stage for the liquid crystal display device; first moving means for relatively moving at least one of the needle and the mounting stage in a horizontal plane; and second moving means for vertically moving at least one of the needle and the mounting stage. At first, the needle is disposed over the fluid bath by the first moving means. The second moving means is lowered so that the needle is immersible into the fluid bath. The fluid adheres to the needle which is immersed into the fluid bath, then the needle to which the fluid has adhered is raised by the second moving means over the fluid bath. Thereafter, the first moving means moves the needle to which the fluid has adhered over the defective-pixel region. The second moving means lowers the needle so that the tip of the needle is moved to the defective-pixel region in the liquid crystal display device. The fluid adhering to the tip of the needle contacts with the defective-pixel region in the liquid crystal display device and therefore adheres to the defective-pixel region, thereby correcting the defective-pixel.

According to the invention, the apparatus for correcting a defective-pixel may further comprise a laser device for conducting at least one of the roughing and concaving operations against the surface of a region corresponding to the defective-pixel. The concave form of the defective-pixel region prevents the shield means disposed in the concave portion from peeling off, and the rough source of the defective-pixel region improves the adhesive force of the shield means.

According to the invention, light leaks from a region corresponding to a defective-pixel is shielded by the shield means disposed in the region corresponding to the defective-pixel. Consequently, the light leakage from the region corresponding to the defective-pixel can be easily prevented from occurring, and thus the display quality can be improved.

BRIEF DESCRIPTION OF THE DRAWINGS

Other and further objects, features, and advantages of the invention will be more explicit from the following detailed description taken with reference to the drawings wherein:

FIGS. 8(1)–8(3) are sectional views illustrating variations of a blocking piece 6 formed in a concave portion 8 shown in FIG. 7;

FIGS. 11(1)–11(4) are sectional views illustrating blocking pieces 46a, 46b, 46c and 46d formed in the concave portion 48 shown in FIG. 10;

FIGS. 16(1)–16(2) are a diagram illustrating a blocking piece disposing device 20 used in one embodiment of the invention.

DETAILED DESCRIPTION OF THE PREFERRED EMBODIMENTS

Now referring to the drawing, preferred embodiments of the invention will be described below.

Figure 1:
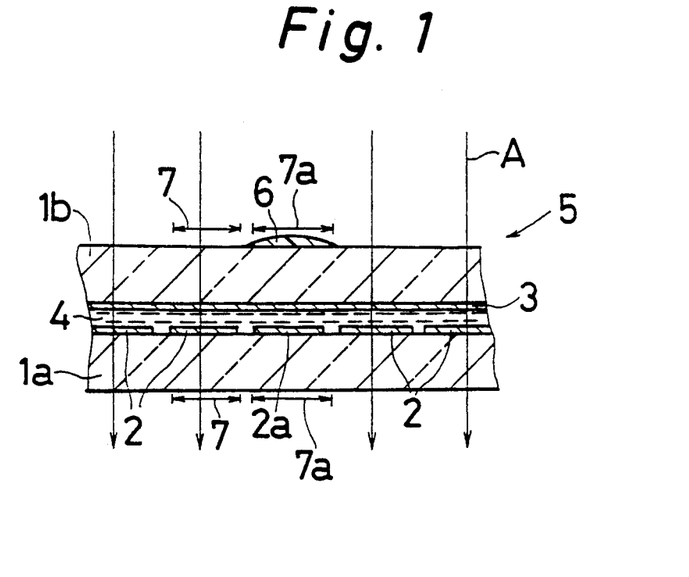
FIG. 1 is a sectional view illustrating a liquid crystal display device 5 which is an embodiment of the invention.
Figure 2:
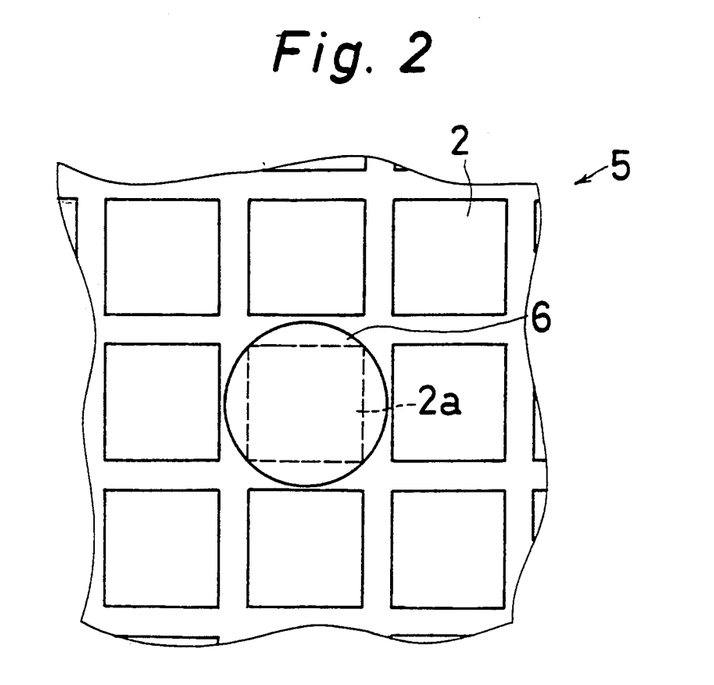
FIG. 2 is a plan view of the liquid crystal display device 5 of FIG. 1.

FIG. 1 is a sectional view illustrating a liquid crystal display device 5 which is an embodiment of the invention which shows features of the invention. FIG. 2 is a plan view of the liquid crystal display device 5 of FIG. 1. A plurality of electrodes 2, 2a constituting pixel regions of the liquid crystal display device 5 are formed on a substrate 1a which is made of glass such as borosilicate glass and non-alkali glass. An electrode 3 is formed on the whole of a surface of a substrate 1b which is made of glass such as borosilicate glass and non-alkali glass. The substrates 1a and 1b are opposingly disposed so that electrodes 2 and 2a and 3 face to each other, and stuck to each other through a liquid crystal 4, thereby constituting the liquid crystal display device 5.

In order to prevent light from entering into the electrode 2a, a blocking piece 6 which functions as the shield means is formed at the position of the substrate 1b corresponding to the electrode 2a. For example, the blocking piece 6 can be obtained by mixing a pigment such as carbon into an acrylic ultraviolet-curing resin and irradiating the resin with ultraviolet (e.g., 250 nm) to cure it.

Supposing the corresponding conductor has been damaged or an insulation failure has occurred in the corresponding switching element, the electrode 2a cannot control the transmission/nontransmission of incident light. Consequently, the pixel region corresponding to the electrode 2a becomes a defective-pixel region 7a. In the embodiment, the defective-pixel region 7a performs only the display of the transmission of light. In this case, when the surrounding electrodes 2 are in the display state of the nontransmission of light, the defective-pixel region 7a allows light to transmit and appears as a bright spot, thereby extremely degrading the display quality of the device.

According to the embodiment, however, since the blocking piece 6 is formed at the position of the substrate 1b corresponding to the electrode 2a which is the defective-pixel region 7a as described above, light entering along the direction of arrow A shown in the figure is blocked. Light is allowed to enter the pixel region 7 corresponding to the electrodes 2 which are able to control the transmission/nontransmission of incident light, but light entering the defective-pixel region 7a is blocked by the blocking piece 6, thereby preventing a bright spot from appearing.

Figure 3:
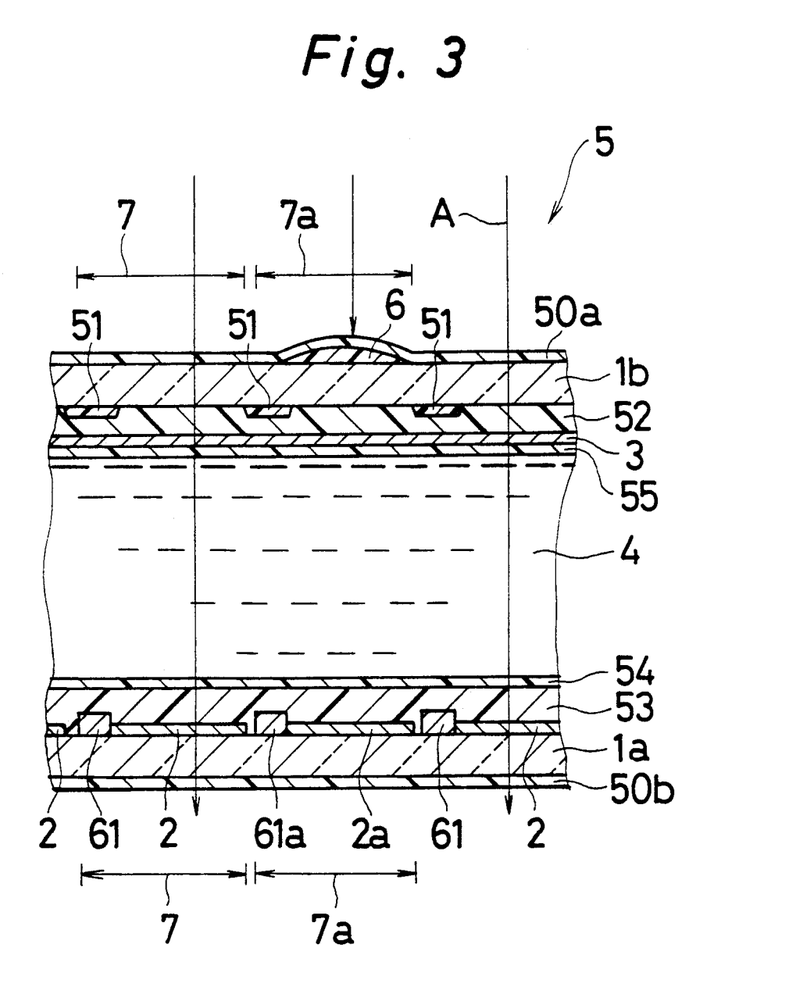
FIG. 3 is a sectional view specifically illustrating the structure of the liquid crystal display device 5 which is an embodiment of the invention.

FIG. 3 is a sectional view specifically illustrating the structure of the liquid crystal display device 5 which is an embodiment of the invention. In FIG. 3, it is shown that TFTs 61 and 61a which function as switching elements for the electrodes 2 and 2a formed on the substrate 1a are respectively provided for the electrodes 2 and 2a. Although TFTs 61 and 61a are used as switching elements in the embodiment, other devices such as MIM (Metal Insulator Metal) diodes may be used as switching elements. An insulating film 53 (e.g., $SiO_2$) is formed on the TFTs 61 and 61a and electrodes 2 and 2a, and an orientation film 54 (e.g., polyimide) is formed on the insulating film 53.

On the region of the substrate 1b which does not correspond to the pixel regions 7 and 7a, formed is a black mask 51 which is produced by depositing chromium and has a thickness of about 1,000 angstroms. A color filter 52 which is made of e.g., dye gelatin is formed on the substrate 1b so as to cover the black mask 51. The electrode 3 is formed on the whole of the surface of the color filter 52, and an orientation film 55 (e.g., polyimide) is formed on the whole of the surface of the electrode 3.

On the outer surfaces of the substrates 1a and 1b, respectively formed are polarizing plates 50a and 50b made of a polyvinyl alcohol (PVA) iodoresin which are obtained, for example, by dyeing a PVA film with iodine.

Supposing the TFT 61 operates normally, the pixel region 7 corresponding to the electrode 2 which is connected to the TFT 61 can control the display due to the transmission/nontransmission of incident light. In contrast, supposing the TFT 61a does not operate normally, the pixel region corresponding to the electrode 2a which is connected to the TFT 61a constitutes the defective-pixel region 7a.

As described above, when the corresponding conductor is broken and hence it is not possible to apply a voltage between the electrodes 2a and 3, the defective-pixel region 7a is always at the no-voltage application state. If the display device is so configured that light is allowed to transmit at the no-voltage application state, the defective-pixel region 7a always allows light to pass. Alternatively, when the insulation structure of the TFT 61a is broken, the defective-pixel region 7a is always at the voltage application state so that, if the display device is so configured that light is allowed to transmit at the voltage application state, the defective-pixel region 7a always allows light to pass. In these cases, the defective-pixel region 7a appears as a bright spot in the same manner as described above, and the provision of the black mask 51 makes the bright spot more distinct, thereby degrading the display quality.

In the same manner as described above, the blocking piece 6 blocks light incident on the defective-pixel region 7a so that light does not enter the defective-pixel region 7a, thereby preventing a bright spot from appearing.

Figure 4:
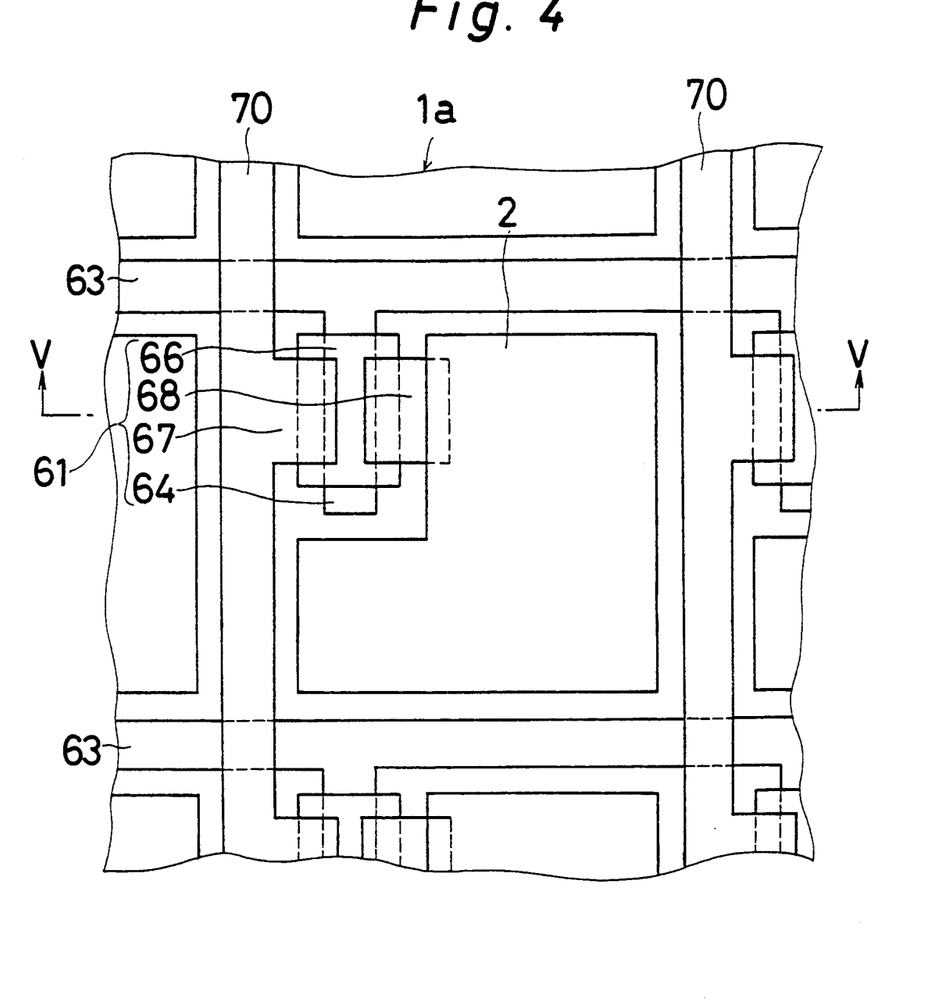
FIG. 4 is a plan view specifically illustrating the structure formed on a substrate 1a shown in FIG. 3.
Figure 5:
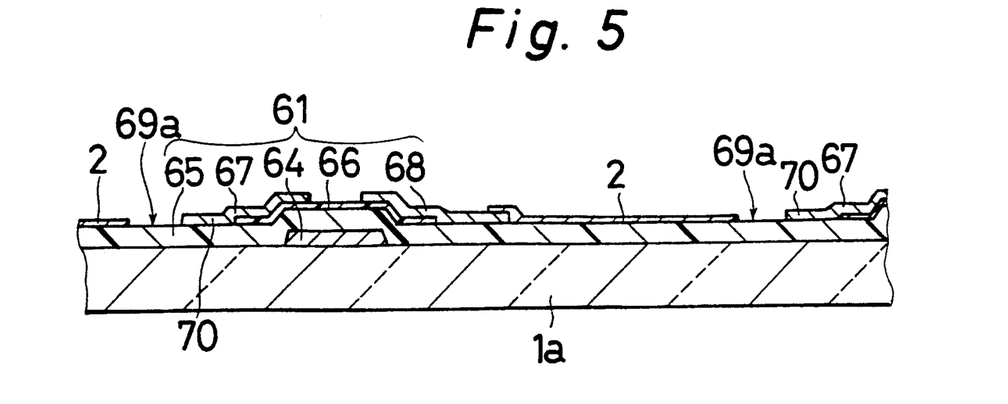
FIG. 5 is a sectional view taken along line V—V of FIG. 4.

FIG. 4 is a plan view specifically illustrating the structure formed on the substrate 1a shown in FIG. 3, and FIG. 5 is a sectional view taken along line V—V of FIG. 4. On the insulation substrate 1a made of glass or the like, a plurality of gate bus lines 63 made of chrome, tantalum or the like are formed in parallel, and branches of the gate bus lines 63 are formed to constitute gate electrodes 64. The gate bus lines 63 function as scanning lines.

A gate insulating film 65 which consists of silicon nitride ($SiN_x$), silicon oxide ($SiO_x$) or the like is formed on the whole of the surface of the substrate 1a to cover the gate electrodes 64. On the gate insulating film 65 which is disposed over the gate electrode 64, a semiconductor layer 66 which consists of amorphous silicon, polysilicon, CdSe or the like is formed. A source electrode 67 which consists of titanium, molybdenum, aluminum or the like is formed so as to cover one end of the semiconductor layer 66. In a similar manner as the source electrode 67, a drain electrode 68 which consists of titanium, molybdenum, aluminum or the like is formed so as to cover the other end of the semiconductor layer 66. A pixel electrode 2 which consists of ITO (Indium Tin Oxide) is formed so as to cover the end of the drain electrode 68 opposite the semiconductor layer 66.

As shown in FIG. 4, the source electrode 67 is connected to a source bus line 70 which intersects the gate bus line 63 through the gate insulating film 65. The source bus line 70 functions as a signal line, and is made of the same metal as the source electrode 67. The gate electrode 64, the gate insulating film 65, the semiconductor layer 66, the source electrode 67 and the drain electrode 68 constitute the TFT 61 which functions as the switching element.

Figure 6:
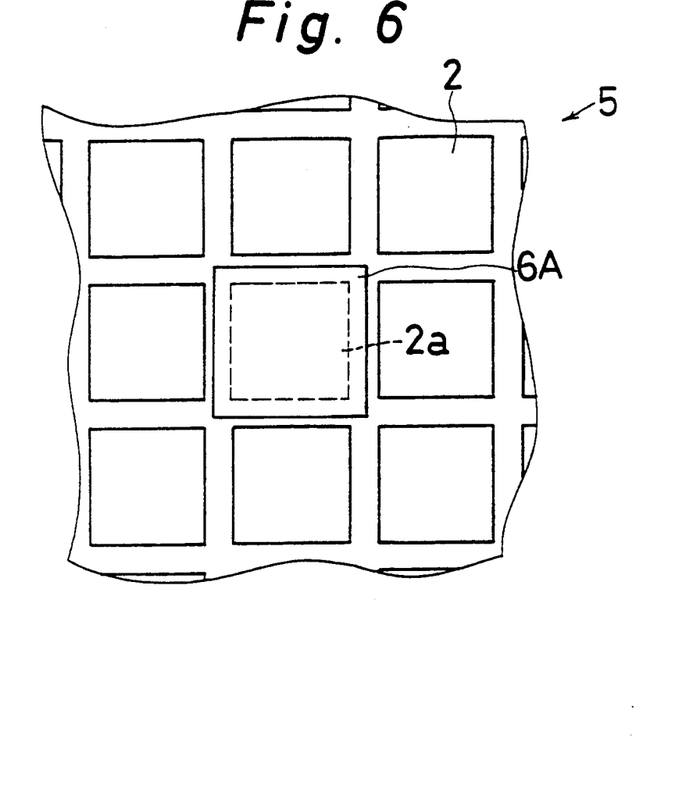
FIG. 6 is a plan view illustrating a variation of the liquid crystal display device 5 which is an embodiment of FIG. 7 is a sectional view illustrating a liquid crystal display device 5a which is another embodiment of the invention.

FIG. 6 is a plan view illustrating a variation of the liquid crystal display device 5 which is an embodiment of the invention. In this embodiment, although a blocking piece 6A formed on the defective-pixel region 7a has a rectangular shape, the same blocking effect as described above can be achieved.

Figure 7:
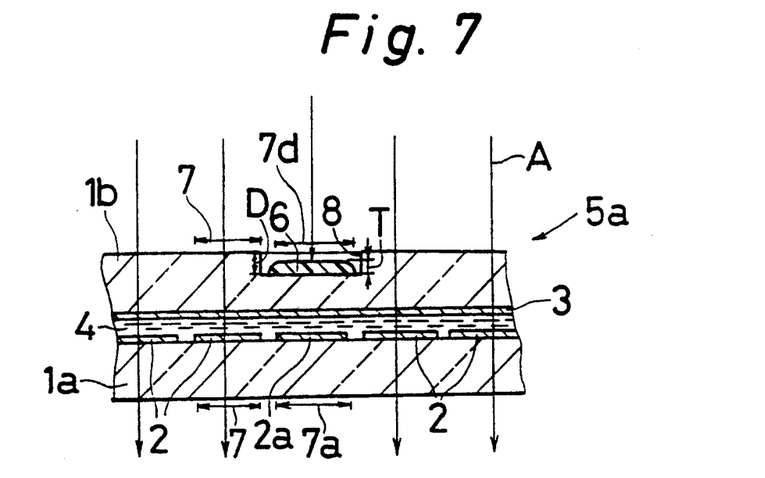
Figure 8:
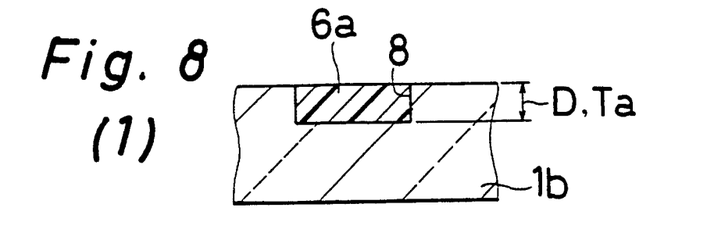

FIG. 7 is a sectional view illustrating a liquid crystal display device 5a which is another embodiment of the invention. The same components as those in FIG. 1 are designated by the same reference numerals. The liquid crystal display device 5a of FIG. 7 differs from the liquid crystal display device 5 of FIG. 1 in that the blocking piece 6 is formed in a concave portion 8 formed on the defective-pixel region 7a of the substrate 1b. The concave portion 8 can be formed by machining, laser etching described below, or the like. The depth D of the concave portion 8 is selected so as to be greater than the thickness T of the blocking piece 6. The liquid crystal display device 5a can attain the same effect as that of the liquid crystal display device 5.

FIG. 8 is a sectional view illustrating variations of the blocking piece 6 formed in the concave portion 8 shown in FIG. 7. The thickness T of the blocking piece 6 shown in FIG. 7 is selected so as to be smaller than the depth D of the concave portion 8. However, the relationship between the thickness T of the blocking piece 6 and the depth D of the concave portion 8 is not restricted to that, and the thickness T of the blocking piece 6 is freely selected as far as the blocking piece can sufficiently block light.

In (1) of FIG. 8, the depth D of the concave portion 8 is selected so as to be equal to the thickness Ta of a blocking piece 6a. In (2) of FIG. 8, the center portion of a blocking piece 6b is formed so as to be lower than the edge portion, and the thickness Tb of the center portion of the blocking piece 6b is selected so as to be smaller than the depth D of the concave portion 8. In (3) of FIG. 8, the thickness Tc of a blocking piece 6c is selected so as to be greater than the depth D of the concave portion 8. These variations also can attain the same effect as the embodiment described above.

Figure 9:
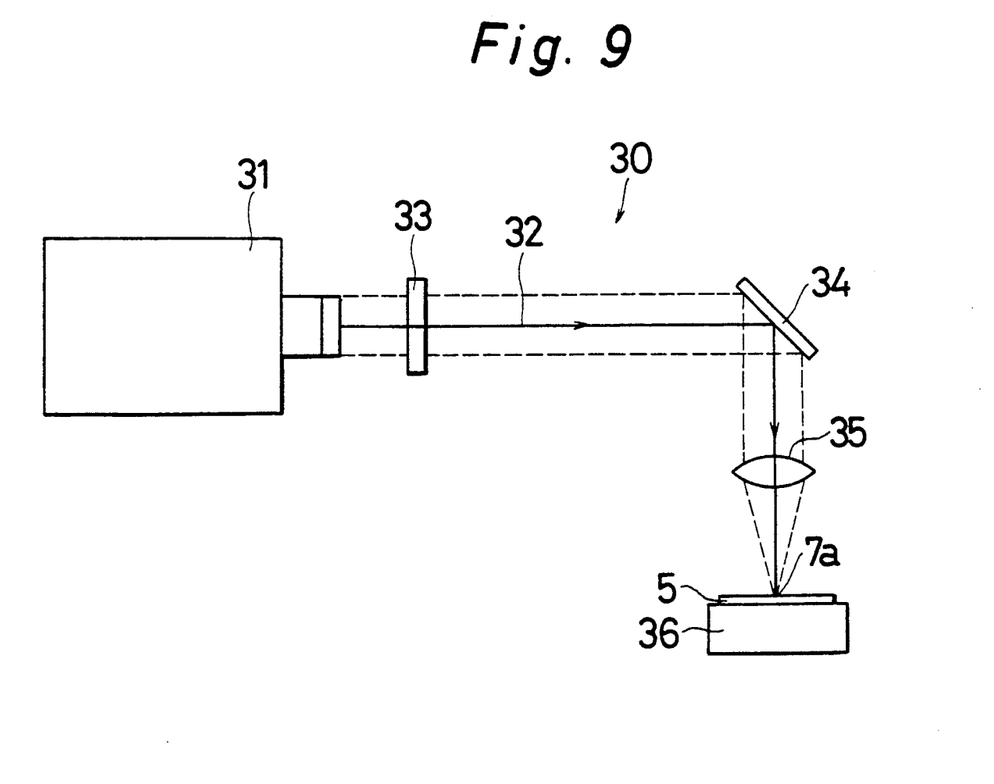
FIG. 9 is a side elevation view illustrating a laser concave portion forming apparatus 30 used in the formation of a concave portion 48 in another embodiment of the invention.

FIG. 9 is a side elevation view illustrating a laser concave portion forming apparatus 30 used in the formation of a concave portion 48 in another embodiment of the invention. A laser beam 32 emitted from a laser oscillator 31 passes through a slit pattern 33 which has an enlarged pattern of the overall size of the concave portion 48 to be formed on the defective-pixel pattern 7a. Thereafter, the laser beam 32 is reflected by an ultraviolet reflection mirror 34, and then converged by a lens 35 to be incident upon the defective-pixel pattern 7a of the liquid crystal display device 5 mounted on a mounting stage 36. The laser beam 32 conducts the reduction slit exposure through the slit pattern 33 so as to be accurately incident upon the position of the defective-pixel pattern 7a. Although it is difficult to form the blocking piece 6 into a shape corresponding to the square shape of the defective-pixel pattern 7a, the use of the slit pattern 33 enables the concave portion 48 to be formed into a square shape, thereby reducing the size of the region required for the formation. The mounting stage 36 is movable along the X and Y axes orthogonal to each other, for example, in the horizontal plane, so that the laser beam 32 can be irradiated to the desired defective-pixel pattern 7a by moving the mounting stage 36.

The defective-pixel pattern 7a has been detected in a preceding step by irradiating the liquid crystal display device 5 with light from a light source, projecting an image displayed on the liquid crystal display device 5 in the driven state, and observing this projected image by an inspector.

Figure 10:
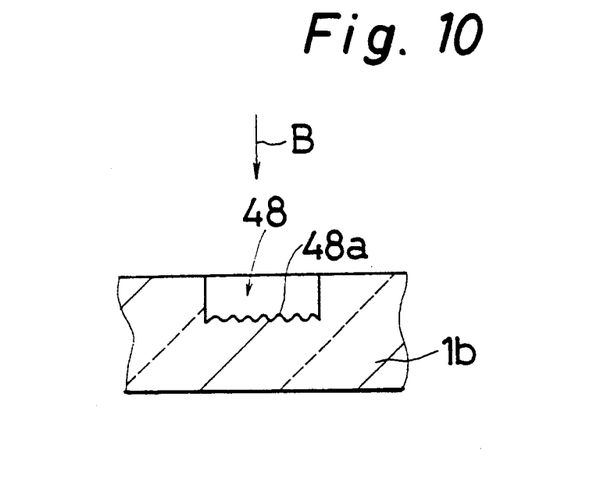
FIG. 10 is a sectional view illustrating a concave portion 48 which is formed on a substrate 1a of a liquid crystal display device 5 using the laser concave portion forming apparatus 30 of FIGS. 8(1)–8(3)
Figure 11:
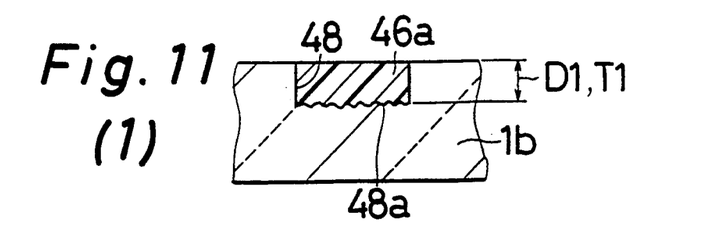

FIG. 10 is a sectional view illustrating the concave portion 48 which is formed on the substrate 1a of the liquid crystal display device 5 using the laser concave portion forming apparatus 30 of FIG. 8. The laser beam 32 is irradiated along arrow B to the position of the defective-pixel pattern 7a on the substrate 1b of the liquid crystal display device 5, whereby the concave portion 48 is formed. The bottom 48a of the concave portion 48 is formed into a rough surface having minute unevenness by controlling the intensity of the laser beam 32.

FIG. 11 is a sectional view illustrating blocking pieces 46a, 46b, 46c and 46d formed in the concave portion 48 shown in FIG. 10. In (1) of FIG. 11, the depth D1 of the concave portion 48 is selected so as to be equal to the thickness T1 of the blocking piece 46a. In (2) of FIG. 11, the center portion of the blocking piece 46b is formed so as to be lower than the edge portion, and the thickness T2 of the center portion of the blocking piece 46b is selected so as to be smaller than the depth D1 of the concave portion 48. In (3) of FIG. 11, the thickness T3 of the blocking piece 46c is selected so as to be greater than the depth D1 of the concave portion 48. In (4) of FIG. 11, the center portion of the blocking piece 46d is formed so as to be higher than the edge portion, but the thickness T4 of the center portion of the blocking piece 46d is selected so as to be smaller than the depth D1 of the concave portion 48. These variations also can attain the same effect as the embodiments described above.

Figure 12:
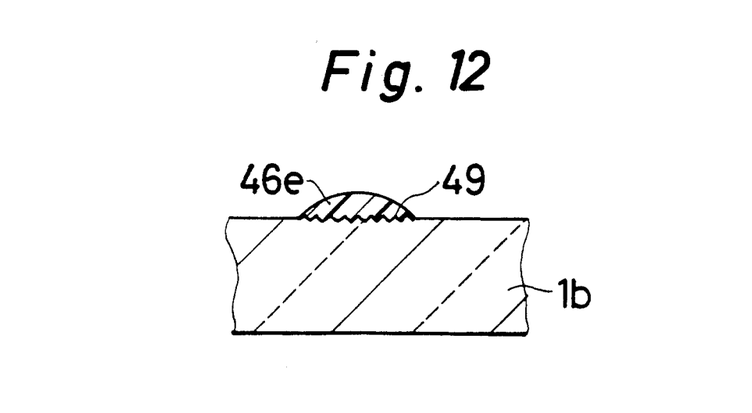
FIG. 12 is a sectional view illustrating a variation of the blocking pieces shown in FIGS. 10 and 11(1)–11(4)

FIG. 12 is a sectional view illustrating a variation of the configuration shown in FIGS. 10 and 11. In the embodiment of FIG. 12, instead of the concave portion 48, an uneven surface 49 is formed by the laser beam 32, and a blocking piece 46e is formed on the uneven surface 49. This variation also can attain the same effect as the embodiments described above.

The concave portion 48 and uneven surface 49 may be formed by a laser etching method in which a $CO_2$ laser is used, or alternatively by a touch-engrave method in which a needle made of a hard metal or diamond is used. However, it is preferable to use of an excimer laser etching method because this method has advantages over those two methods as described below.

When compared with the touch-engrave method, the excimer laser etching method has advantages that the roughing operation can be performed easily and that it is possible to form the bottom 48a or uneven surface 49 with unevenness of an excellent accuracy.

Since the $CO_2$ laser etching is a heat process method, it causes a thermal damage to the glass portion surrounding the defective-pixel region 7a. In contrast, the excimer laser etching is in principle a method in which the bonding structure is split by the light energy, and therefore does not cause such a thermal damage.

As a filler gas for the excimer laser etching, ArF (argon fluoride, oscillation wave length: 193 nm), KrF (krypton fluoride, oscillation wave length: 248 nm), XeCl (xenon chloride, oscillation wave length: 308 nm), etc. may be used. Depending upon the kind of the filler gas, the pulse energy of an excimer laser oscillator which functions as the laser oscillator 31 varies in level, and hence the resulting surface roughness of the bottom 48a or uneven surface 49 also varies. According to the following results of experiments conducted by the inventors, it was confirmed that the excimer laser etching in which KrF is used as a filler gas is most suitable for the correction method of the invention.

Reviewing the experimental results in order to seek an oscillation wave length suitable for forming the bottom 48a having a surface to which ink can tightly adhere, it was found that the laser beam of KrF (248 nm) can form the bottom 48a having a desired surface, and that the bottom 48a formed by the laser beam of ArF (193 nm) has a relatively smooth surface as compared with that formed by the laser beam of KrF and thus is not suitable for the purpose. Since the laser beam of XeCl (308 nm) can pass through glass, it was not possible to make the surface of the bottom 48a rough by the laser beam of XeCl.

When the blocking piece 6 is formed on the substrate 1b as shown in FIG. 1, the blocking piece 6 becomes a projection on the substrate 1b which is liable to be peeled off when rubbed with another element in a step of mounting the liquid crystal display device 5 or when the substrate 1b is cleaned by a cloth or the like. This may cause a problem in that the reliability for the light blocking is lowered.

This problem can be solved by forming the blocking pieces 6, 6A, 6a to 6c and 46a to 46d (hereinafter, these blocking pieces are generally referenced by 56) in the concave portion 8 or 48 or on the uneven surface 49 formed on the substrate 1b as shown in FIGS. 7, 8, 11 and 12.

The blocking piece 56 is formed, for example, by curing an ultraviolet-curing resin. In the invention, it is preferable to use an ultraviolet-curing resin which has a property of blocking light or into which a pigment having a property of blocking light is mixed.

The blocking piece 56 is so constructed that its size is sufficient for covering the defective-pixel region 7a, and that its thickness is sufficient for blocking light.

Figure 13:
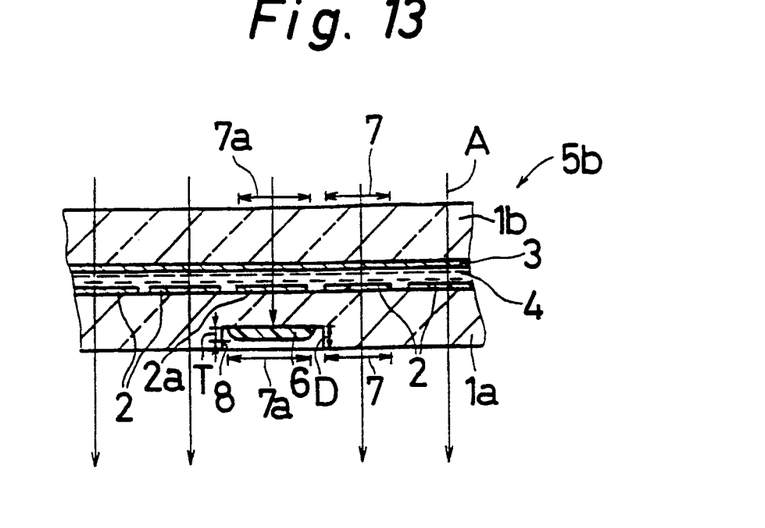
FIG. 13 is a sectional view illustrating a further embodiment of the invention.
Figure 14:
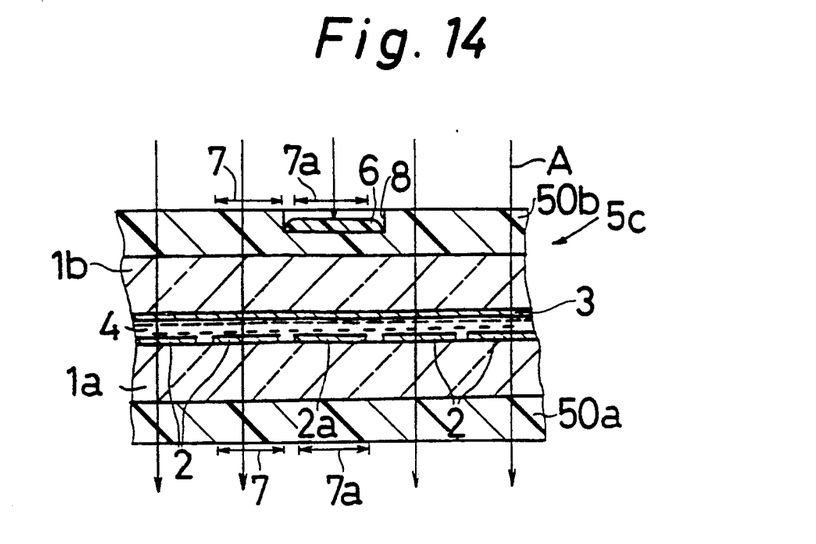
FIG. 14 is a sectional view illustrating a still further embodiment of the invention.
Figure 15:
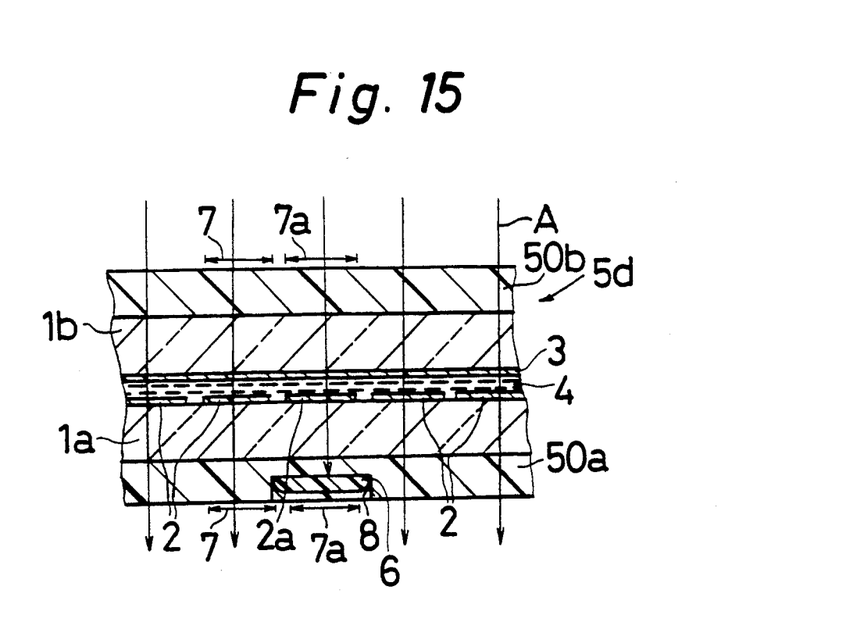
FIG. 15 is a sectional view illustrating a yet further embodiment of the invention.
Figure 16:
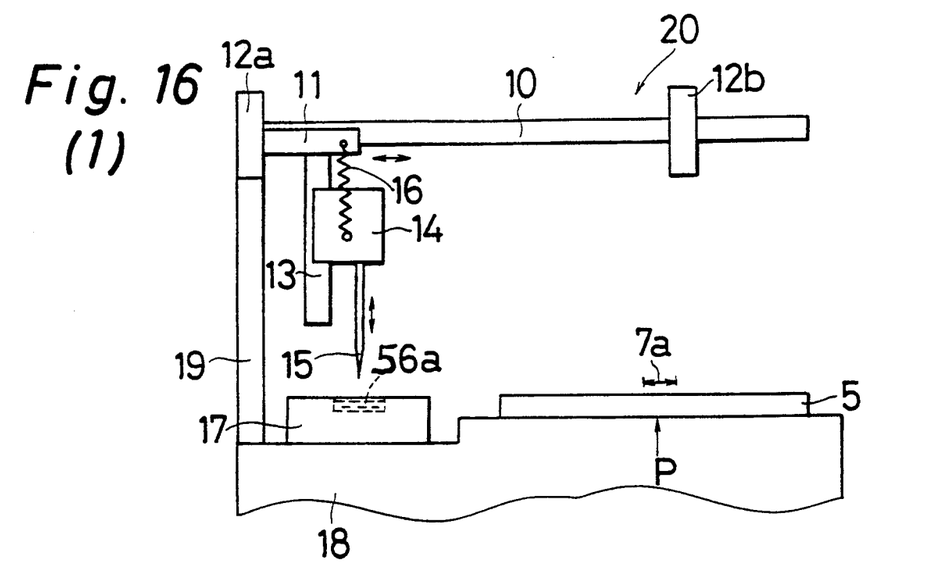

FIGS. 13, 14 and 15 respectively illustrate other embodiments of the invention. In the figures, the same components as those used in the above-described embodiments are designated by the same reference numerals. In a liquid crystal display device 5b of FIG. 13, the concave portion 8 is formed on the substrate 1a, and the blocking piece 6 is disposed is in the concave portion 8. In liquid crystal display devices 5c and 5d of FIGS. 14 and 15, the polarizing plates 50a and 50b are respectively formed on the substrates 1a and 1b. In the liquid crystal display device 5c of FIG. 14, the concave portion 8 is formed on the polarizing plate 50b, and the blocking piece 6 is formed in the concave portion 8. In the liquid crystal display device 5d of FIG. 15, the concave portion 8 is formed on the polarizing plate 50a, and the blocking piece 6 is formed in the concave portion 8.

The position of the blocking piece 56 can be freely selected provided that it is positioned in the light path passing the defective-pixel region 7a. For example, the blocking piece 56 can be formed on the substrate 1b upon which light from the liquid crystal display device 5 or 5a is incident as shown in FIGS. 1, 3, 7, 8, 11 and 12, or on the substrate 1a from which light goes out as shown in FIG. 13. Alternatively, as shown in FIGS. 14 and 15, the blocking piece 6 can be formed at a position of the polarizing plate 50a or 50b or glass which corresponds to the defective-pixel region 7a, and, if necessary, after the formation of the concave portion 8. These variations also can attain the same effect as the embodiments described above.

The concave portion 8 shown in FIGS. 13, 14 and 15 may be the concave portion 48 or uneven surface 49 which is formed by the laser beam 32. The blocking piece 6 may be formed without forming the concave portion 48. The shape of the blocking piece 6 is not restricted to those above described and shown in the figures.

The result of the experiment on the relationship between the depth D1 of the concave portion 48 and the light shielding property shows that the depth D1 of 10 $\mu$m or more is required to attain a complete light shield.

The concave portion 48 is formed so that it exists within the region for forming the black mask 51 which surrounds the defective-pixel region 7a, and that it does not extend into the adjacent pixel regions 7. When the size of each pixel is 50 $\mu$m $\times$ 90 $\mu$m, the size of the concave portion 48 is generally within the range of 80 $\mu$m $\times$ 100 $\mu$m to 150 $\mu$m $\times$ 200 $\mu$m. It is preferable that the depth D1 is within the range of 150 $\mu$m to 250 $\mu$m.

Preferably, the height of convex portions formed in the bottom 48a which is a rough surface having minute unevenness or in the uneven surface 49 is within the range of 10 $\mu$m to 50 $\mu$m (estimated values with the aid of a microscope). The formation of a rough surface in which the height of convex portions is greater than 10 $\mu$m is carried out through a slit mask having a mesh pattern.

FIG. 16 is a diagram illustrating a blocking piece disposing device 20 used in one embodiment of the invention. In FIG. 16, (1) illustrates step a1 shown in FIG. 17 which is described below, and (2) illustrates step a5 shown in FIG. 17.

On the lower surface of a rail 10 which is horizontally supported by a frame 19, disposed is a sliding member 11 which is slidable along the rail 10. The sliding range of the sliding member 11 along the rail 10 is defined by two stoppers 12a and 12b which are fixed to the rail 10.

The sliding member 11 is provided with a supporting member 13 which elongates downward in FIG. 16. The supporting member 13 is provided with a sliding piece 14 which can slide along the vertical direction in FIG. 16. The sliding piece 14 is provided with a needle 15 which elongates downward in FIG. 16.

One end of a spring 16 is fixed to the sliding member 11, and the other end of the spring 16 to the sliding piece 14. The sliding piece 14 is biased toward the sliding member 11 by the spring 16.

A stage 18 is disposed under the structure shown in FIG. 16. A vessel 17 for holding a resin 56a which will be formed into the blocking piece 56, and the liquid crystal display device 5 having the defective-pixel region 7a are mounted on the stage 18. The resin 56a is an ultraviolet-curing resin, and is liquid before the ultraviolet irradiation process.

The vessel 17 is positioned so that, when the sliding member 11 abuts the stopper 12a, the resin 56a can be adhered to the needle 15 by lowering the sliding piece 14. The liquid crystal display device 5 is placed so that the defective-pixel region 7a is positioned at a position P to which the needle 15 is contacted by lowering the sliding x piece 14 when the sliding member 11 abuts the stopper 12b. The device 20 of FIG. 16 may optionally be provided with laser means 31 (not shown) for performing the roughing and/or concaving operations on a defective pixel.

Figure 17:
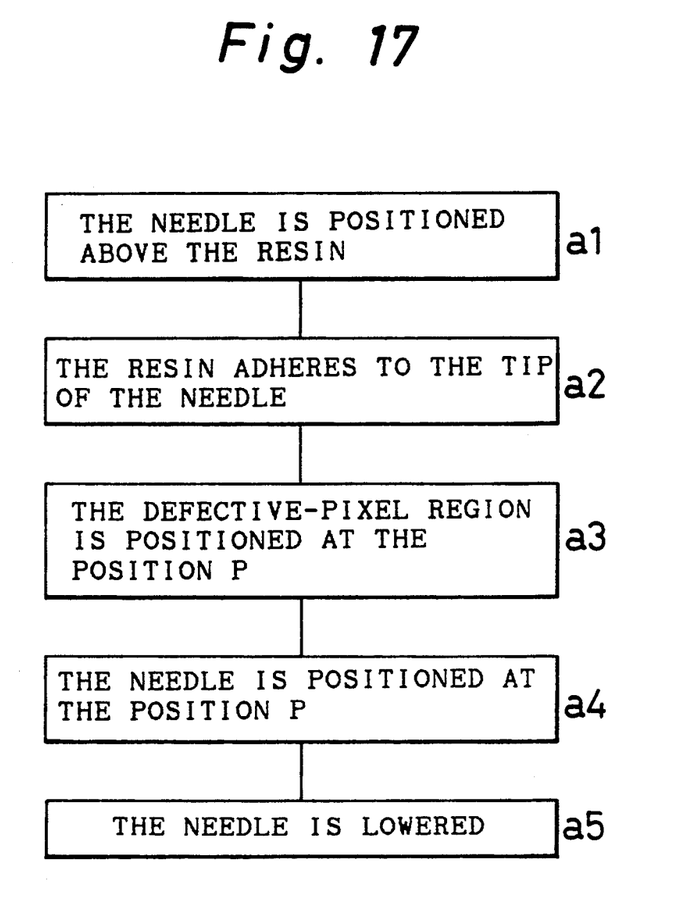
FIG. 17 is a flow chart relating to steps of disposing a blocking piece 56 using the blocking piece disposing device 20 and illustrating steps conducted until a resin is adhered.

FIG. 17 is a flow chart illustrating steps of disposing the blocking piece 56 using the blocking piece disposing device 20 of FIG. 16. In step a1, as shown in (1) of FIG. 16, the sliding member 11 is moved to the position in which it abuts the stopper 12a. In this state, the needle 15 is positioned above the resin 56a. In step a2, the sliding piece 14 is lowered so that the resin 56a adheres to the tip of the needle 15.

In step a3, the liquid crystal display device 5 is moved so that the defective-pixel region 7a is positioned at the position P to which the needle 15 is contacted by lowering the sliding piece 14 when the sliding member 11 is moved to abut the stopper 12b.

In step a4, the sliding member 11 is slid until it abuts the stopper 12b. In step a5, as shown in (2) of FIG. 16, the sliding piece 14 is lowered so that the tip of the needle 15 comes in contact with the defective-pixel region 7a, whereby the resin 56a is adhered to the defective-pixel region 7a.

Thereafter, the resin 56a is irradiated with ultraviolet light so as to be cured. The resin 56a cures and tightly adheres to the liquid crystal display device 5.

The size of the blocking piece 56 can be adequately selected in accordance with the shape and size of the tip of the needle 15, the thickness of the layer of the resin 56a in the vessel 17, etc.

In the embodiment, the liquid crystal display device 5 is mounted on the stage 18. Alternatively, the liquid crystal display device 5a, 5b, 5c or 5d or a liquid crystal display device on which a glass plate is placed can be mounted on the stage 18. The process of positioning the defective-pixel region 7a of the liquid crystal display device 5, 5a, 5b, 5c or 5d to the position P may be conducted by projecting their display image on a screen and moving the image of the defective-pixel region 7a so as to coincide with a predetermined point on the screen.

The formation of the blocking piece 56 is not restricted to the process using the blocking piece disposing device 20, but may be manually performed, or automatically conducted using an optical sensor, etc.

Although an ultraviolet-curing resin is used as the blocking piece 56 in the illustrated embodiments, other resins can be used in the invention. For example, black ink such as oily ink for an ink jet printer (viscosity: 2.88 cp at 25° C.) can be used in the invention.

As described above, according to the embodiments, the leakage of light from the defective-pixel can be prevented from occurring by blocking the light path passing through the defective-pixel region 7a, thereby improving the display quality.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display device comprising pixels arranged in a matrix form, wherein shield means is disposed in a defective-pixel region of the liquid crystal display device, and wherein the shield means is disposed on a glass substrate of the liquid display device.

2. A liquid crystal display device comprising pixels arranged in a matrix form, wherein shield means is disposed in a defective-pixel region of the liquid crystal display device, and wherein the shield means is in a concave portion formed on a glass of liquid crystal display device.

3. A liquid crystal display device comprising pixels arranged in a matrix form, wherein shield means is disposed in a defective-pixel region of the liquid crystal display device, and wherein the shield means is disposed on a polarizing plat of the liquid crystal display device.

4. A liquid crystal display device comprising pixels arranged in a matrix form, wherein shield means is disposed in a defective-pixel region of the liquid crystal display device, and wherein the shield means is disposed in a concave portion formed on a polarizing plate of the liquid crystal display device.

5. A liquid crystal display device comprising pixels arranged in a matrix form, wherein shield means is disposed in a defective-pixel region of the liquid crystal display, and wherein the surface of the shield means has a concave form or convex form.

6. A liquid crystal display device comprising pixels arranged in a matrix form wherein shield means is disposed in a defective-pixel region of the liquid crystal display device, wherein a defective-pixel region has a rough surface.

7. A method of correcting a defective-pixel in a liquid crystal display device comprising pixels arranged in a matrix form, wherein a light shielding fluid is introduced dropwise into a defective-pixel region in the liquid crystal display device, and cured therein.

8. A method according to claim 7, wherein the light shielding fluid is dropped into a defective-pixel region of a glass or polarizing plate of the liquid crystal display device.

9. A method according to claim 8, wherein the light shielding fluid is dropped into a concave portion formed in a defective-pixel region.

10. A method according to claim 8 or 9, wherein a surface of a defective-pixel region is roughed by irradiating a laser beam before said light shielding fluid is introduced.

11. An apparatus for correcting a defective-pixel region in a liquid crystal display device comprising pixels arranged in a matrix form, comprising:
 a fluid bath for holding a fluid to form shield means;
 a needle to which the fluid can adhere;
 a mounting stage for the liquid crystal display device;
 first means for relatively moving at least one of the needle and the mounting stage in a horizontal plane; and
 second means for vertically moving at least one of the needle and the mounting stage,
 the needle being disposed over the fluid bath using the first moving means, and lowered using the second moving means so as to be immersible into the fluid bath, the needle to which the fluid has adhered being raised using the second moving means over the fluid bath, the needle to which the fluid has adhered being moved over the defective-pixel region using the first moving means, and the tip of the needle being moved to the defective-pixel region in the liquid crystal display device using the second moving means, thereby causing the fluid adhering to the tip of the needle to adhere the defective-pixel region.

12. An apparatus for correcting a defective-pixel region according to claim 11, wherein the apparatus further comprises laser means for conducting at least one of the roughing and concaving operations against the surface of the defective-pixel region.

* * * * *

UNITED STATES PATENT AND TRADEMARK OFFICE
CERTIFICATE OF CORRECTION

PATENT NO.   : 5,267,066
DATED        : November 30, 1993
INVENTOR(S)  : Nakai et al.

It is certified that error appears in the above-identified patent and that said Letters Patent is hereby corrected as shown below:

item [75] Inventors: on the cover page, names of two inventors, Fuyuto KUMAGAI and Masatsugu HATANAKA were omitted at the end of the inventor list and are hereby added.

Signed and Sealed this

Seventeenth Day of May, 1994

Attest:

BRUCE LEHMAN

*Attesting Officer*        *Commissioner of Patents and Trademarks*